(12) United States Patent
Pathak et al.

(10) Patent No.: US 11,544,246 B2
(45) Date of Patent: *Jan. 3, 2023

(54) PARTITION LEVEL OPERATION WITH CONCURRENT ACTIVITIES

(71) Applicant: SYBASE, INC., Dublin, CA (US)

(72) Inventors: Amit Pathak, Pune (IN); Paresh Rathod, Pune (IN); Swati Sharma, Pune (IN); Nikhil Jamadagni, Fremont, CA (US)

(73) Assignee: SYBASE, INC., Dublin, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/030,332

(22) Filed: Sep. 23, 2020

(65) Prior Publication Data

US 2021/0081395 A1   Mar. 18, 2021

Related U.S. Application Data

(63) Continuation of application No. 15/871,819, filed on Jan. 15, 2018, now Pat. No. 10,803,046, which is a
(Continued)

(51) Int. Cl.
*G06F 16/00* (2019.01)
*G06F 16/23* (2019.01)
(Continued)

(52) U.S. Cl.
CPC ...... *G06F 16/2343* (2019.01); *G06F 16/1774* (2019.01); *G06F 16/2282* (2019.01);
(Continued)

(58) Field of Classification Search
CPC ............ G06F 16/2343; G06F 16/2379; G06F 16/2282; G06F 16/1774; G06F 16/278; G06F 16/2365
See application file for complete search history.

(56) References Cited

U.S. PATENT DOCUMENTS 6,728,709 B1 * 4/2004 Plasek ............... G06F 16/2343
6,754,656 B1 * 6/2004 Cornwell ........... G06F 16/2343
                                                   707/999.009
(Continued)

OTHER PUBLICATIONS

"U.S. Appl. No. 14/212,861, Non Final Office Action dated Nov. 2, 2015", 10 pgs.
(Continued)

*Primary Examiner* — Hung Q Pham
(74) *Attorney, Agent, or Firm* — Schwegman Lundberg & Woessner, P.A.

(57) ABSTRACT

Techniques of implementing partition level operations with concurrent activities are disclosed. A first operation can be performed on a first partition of a table of data. The first partition can be one of a plurality of partitions of the table, where each partition has a plurality of rows. A first partition level lock can be applied to the first partition for a period in which the first operation is being performed on the first partition, thereby preventing any operation other than the first operation from being performed on the first partition during the period the first partition level lock is being applied to the first partition. A second operation can be performed on a second partition of the table at a point in time during which the first operation is being performed on the first partition.

20 Claims, 14 Drawing Sheets

Related U.S. Application Data continuation of application No. 15/153,102, filed on May 12, 2016, now Pat. No. 9,916,341, which is a continuation of application No. 14/212,861, filed on Mar. 14, 2014, now Pat. No. 9,342,549.

(51) Int. Cl.
  *G06F 16/27* (2019.01)
  *G06F 16/176* (2019.01)
  *G06F 16/22* (2019.01)

(52) U.S. Cl.
  CPC ...... *G06F 16/2365* (2019.01); *G06F 16/2379* (2019.01); *G06F 16/278* (2019.01)

(56) References Cited

U.S. PATENT DOCUMENTS

| | | | |
|---|---|---|---|
| 9,342,549 | B2 | 5/2016 | Pathak et al. |
| 9,916,341 | B2 | 3/2018 | Pathak et al. |
| 2004/0199512 | A1* | 10/2004 | Cornwell ............ G06F 16/2343 707/999.009 |
| 2007/0299814 | A1 | 12/2007 | Barsness et al. |
| 2008/0010283 | A1 | 1/2008 | Cornwell et al. |
| 2010/0191884 | A1* | 7/2010 | Holenstein .......... G06F 11/2094 707/613 |
| 2013/0060742 | A1 | 3/2013 | Chang et al. |
| 2014/0181342 | A1 | 6/2014 | Antonopoulos et al. |
| 2015/0261807 | A1 | 9/2015 | Pathak et al. |
| 2016/0364430 | A1 | 12/2016 | Pathak et al. |
| 2018/0137159 | A1 | 5/2018 | Pathak et al. |

OTHER PUBLICATIONS

"U.S. Appl. No. 14/212,861, Notice of Allowance dated Mar. 15, 2016", 7 pgs.
"U.S. Appl. No. 14/212,861, Response filed Jan. 22, 2016 to Non Final Office Action dated Nov. 2, 2015", 14 pgs.
"U.S. Appl. No. 15/153,102, Examiner Interview Summary dated Jul. 27, 2017", 3 pgs.
"U.S. Appl. No. 15/153,102, Non Final Office Action dated Jun. 21, 2017", 13 pgs.
"U.S. Appl. No. 15/153,102, Notice of Allowance dated Nov. 13, 2017", 7 pgs.
"U.S. Appl. No. 15/153,102, Preliminary Amendment filed Jun. 15, 2016", 14 pgs.
"U.S. Appl. No. 15/153,102, Response filed Sep. 20, 2017 to Non Final Office Action dated Jun. 21, 2017", 27 pgs.
"U.S. Appl. No. 15/871,819, Non Final Office Action dated Mar. 3, 2020", 9 pgs.
"U.S. Appl. No. 15/871,819, Notice of Allowance dated Jul. 13, 2020", 8 pgs.
"U.S. Appl. No. 15/871,819, Preliminary Amendment filed Jan. 23, 2018", 5 pgs.
"U.S. Appl. No. 15/871,819, Response filed May 20, 2020 to Non Final Office Action dated Mar. 3, 2020", 18 pgs.
"U.S. Appl. No. 15/871,819, Supplemental Notice of Allowability dated Aug. 28, 2020", 4 pgs.

\* cited by examiner

PARTITION LEVEL OPERATION WITH CONCURRENT ACTIVITIES

CROSS-REFERENCE TO RELATED APPLICATIONS

This application is a continuation of prior U.S. application Ser. No. 15/871,819, filed on Jan. 15, 2018, which is a continuation of prior U.S. application Ser. No. 15/153,102, filed on May 12, 2016, which is a continuation of prior U.S. application Ser. No. 14/212,861, filed on Mar. 14, 2014, which applications are incorporated by reference herein in their entirety.

TECHNICAL FIELD

The present application relates generally to the technical field of data processing, and, in various embodiments, to methods and systems of implementing partition level operations with concurrent activities.

BACKGROUND

A table of data within a database server can be partitioned into multiple subsets. There are different ways to partition a table (e.g., range, list, round robin, etc.). Data Manipulation Language (DML) operations, as well as other operations, are allowed on the partitions. Currently, for every operation that is performed on a partition, a table level lock is applied, thereby preventing any operation from being performed on any other part (e.g., any other partition) of the table. In one example, there are 10 partitions in a table (e.g., partitions P1, P2, . . . , P10). A split operation is performed on partition P1, splitting partition P1 into P1' and P1" such that there are now 11 partitions in the table instead of 10 partitions. During the split operation on partition P1, a table level lock is applied to the table in order to prevent any other operations on partition P1 during the performance of the split operation. The problem is that any concurrent operations on other partitions in the table (e.g., select from other partitions, insert into another partition, update values in other partitions) are placed on hold due to the table level lock. The other operations have to wait until the splitting of partition P1 into P1' and P1" is complete.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
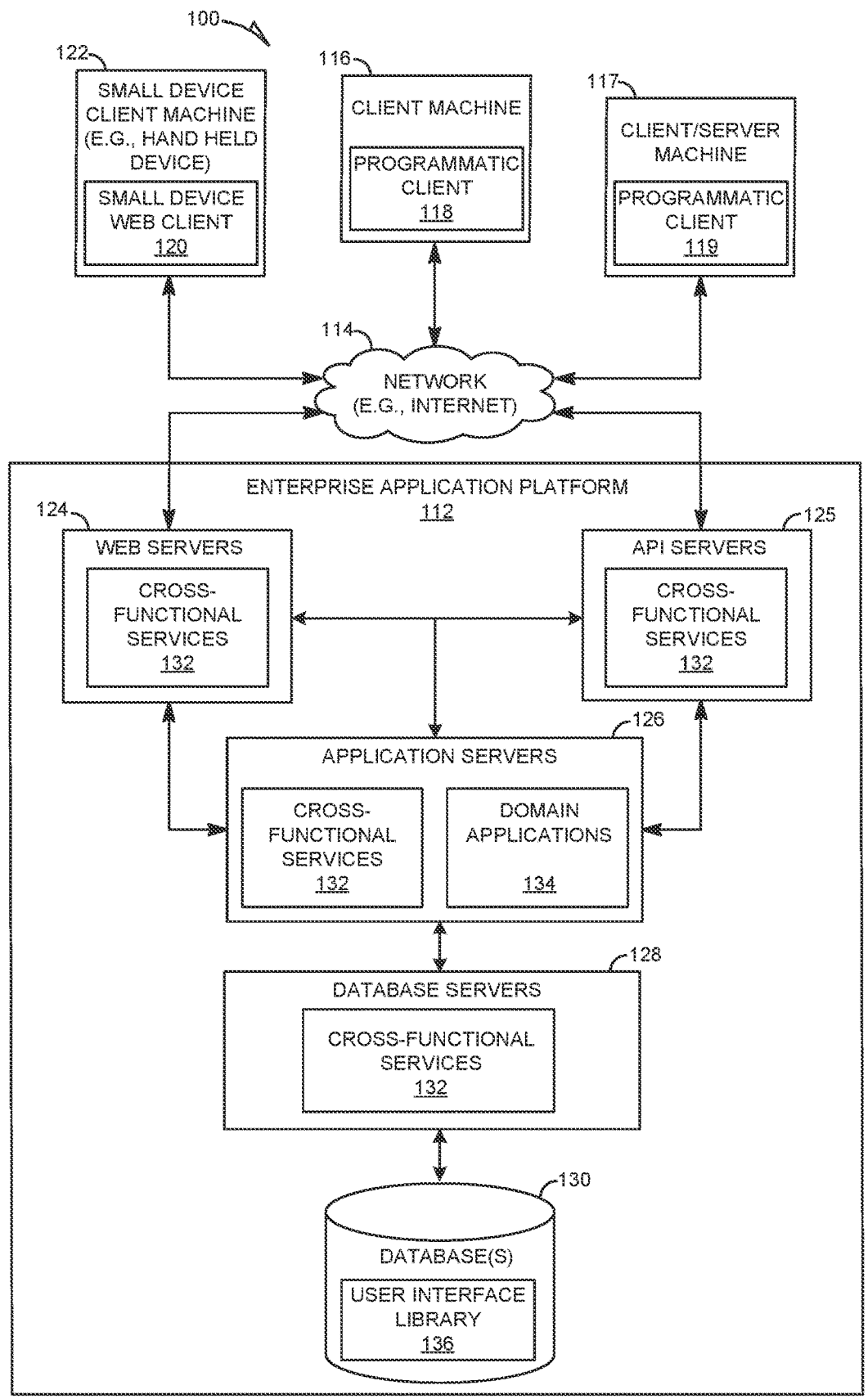
FIG. 1 is a network diagram illustrating a client-server system, in accordance with some embodiments.

Example methods and systems of implementing partition level operations with concurrent activities are described. In the following description, for purposes of explanation, numerous specific details are set forth in order to provide a thorough understanding of example embodiments. It will be evident, however, to one skilled in the art that the present embodiments can be practiced without these specific details.

The present disclosure introduces a partition level lock. The partition level lock, when applied on a particular partition of a table during the performance of an operation on that particular partition, can block any other operations from being performed on that particular partition, while still allowing operations to be performed on other partitions of the table. The partition level lock, along with the other features disclosed herein, improves the concurrency of operations that can occur on a table of data.

In some embodiments, a first operation is performed on a first partition of a table of data. The first partition can be one of a plurality of partitions of the table, with each partition in the plurality of partitions having a plurality of rows. A first partition level lock can be applied to the first partition for a period in which the first operation is being performed on the first partition. The first partition level lock can prevent any operation other than the first operation from being performed on the first partition during the period the first partition level lock is being applied to the first partition. A second operation can be performed on a second partition of the table at a point in time during which the first operation is being performed on the first partition. The second partition can be one of the plurality of partitions of the table.

In some embodiments, the first operation and the second operation each comprise one of an insert operation, a select operation, an update operation, a delete operation, a split operation, a merge operation, a move operation, a truncate operation, and a drop operation.

In some embodiments, lock promotion can be used to exchange row level locks on rows of a partition for a partition level lock on the partition. In some embodiments, the first partition level lock is applied to the first partition based on a predefined threshold number of row level locks being applied to rows within the first partition.

In some embodiments, a schema lock mechanism is implemented. A first update of a schema of the table can be performed based on the performance of the first operation on the first partition. A schema level lock can be applied to the schema of the table for a period covering the performance of the first update of the schema. The schema level lock can prevent any update other than the first update from being performed on the schema during the performance of the first update on the schema. A performance of a second update of the schema can be delayed until after a completion of the first update based on the application of the schema level lock to the schema. The second update can be based on the performance of the second operation on the second partition.

In some embodiments, concurrent DML operations (e.g., insert, select, update, delete) are allowed on a partition that is undergoing maintenance activity. A request to perform a third operation on the first partition can be received during the performance of the first operation on the first partition. It can be determined that the first partition level lock is being applied to the first partition at the time the request to perform the third operation is received. It can be determined that the first partition level lock has been released from the first partition. The third operation on the first partition can be performed based on the determination that the first partition level lock has been released from the first partition.

In some embodiments, table level statistics are maintained through a collection of partition level statistics. A corresponding set of partition level statistics can be stored for each one of the partitions in the plurality of partitions. Each set of partition level statistics can comprise statistics specific to the partition to which the set corresponds. A set of table level statistics can be stored for the table. The corresponding set of partition level statistics for the first partition can be updated based on the performance of the first operation on the first partition. The corresponding set of partition level statistics for the first partition can be merged with the set of table level statistics. The corresponding set of partition level statistics for the second partition can be updated based on the performance of the second operation on the second partition. The corresponding set of partition level statistics for the second partition can be merged with the set of table level statistics.

In some embodiments, an efficient technique for rebuilding global indexes is implemented. In response to the first operation on the first partition completing, it can be determined that the second operation is still being performed on the second partition. A rebuilding of a global index of the table can be delayed in response to the determination that the second operation is being performed on the second partition. In response to the second operation on the second partition completing, it can be determined that no other operations are being performed on any of the partitions of the table. The rebuilding of the global index of the table can be performed in response to the determination that no other operations are being performed on any of the partitions of the table. The rebuilding of the global index can involve an effect of the performance of the first operation on the first partition and an effect of the performance of the second operation on the second partition.

In some embodiments, an efficient technique for handling metadata is implemented. A first clone of original metadata of the table can be generated based on the performance of the first operation on the first partition. A second clone of the original metadata of the table can be generated based on the performance of the second operation on the second partition. New metadata of the table can be generated based on a merge of the first clone and the second clone. The original metadata can be discarded.

In some embodiments, a covering partition lock is implemented to handle situations where a partition identity is unknown. A third operation is performed on a third partition of the table. The third partition can be one of the plurality of partitions of the table. It can be determined that an identity of the third partition is unknown. In response to the determination that the identity of the third partition is unknown, a covering partition lock can be applied on all partitions of the table for a period in which the third operation is being performed on the third partition. The covering partition lock can prevent any operation other than the third operation from being performed on any of the partitions of the table during the period the covering partition lock is being applied.

The methods or embodiments disclosed herein may be implemented as a computer system having one or more modules (e.g., hardware modules or software modules). Such modules may be executed by one or more processors of the computer system. In some embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 3.

Figure 2:
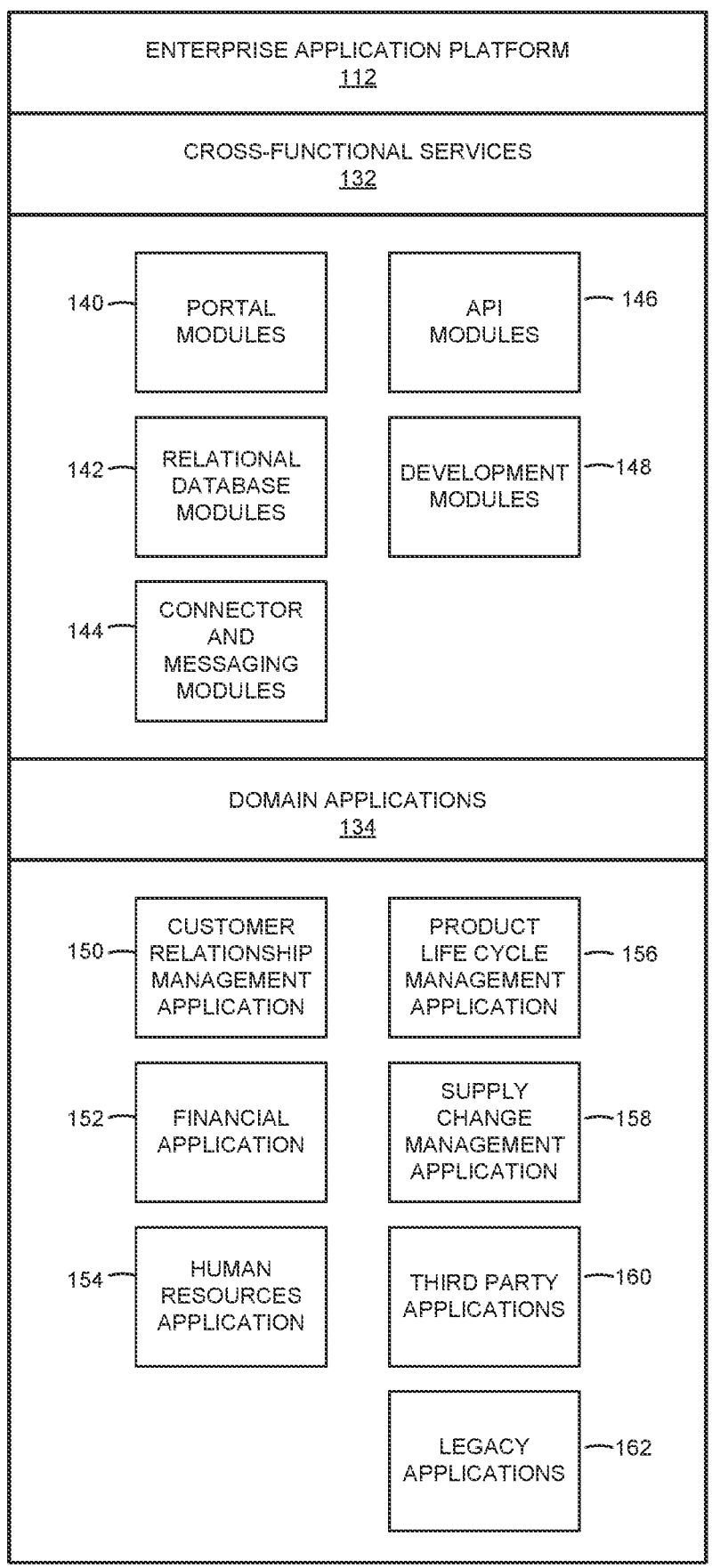
FIG. 2 is a block diagram illustrating enterprise applications and services in an enterprise application platform, in accordance with some embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
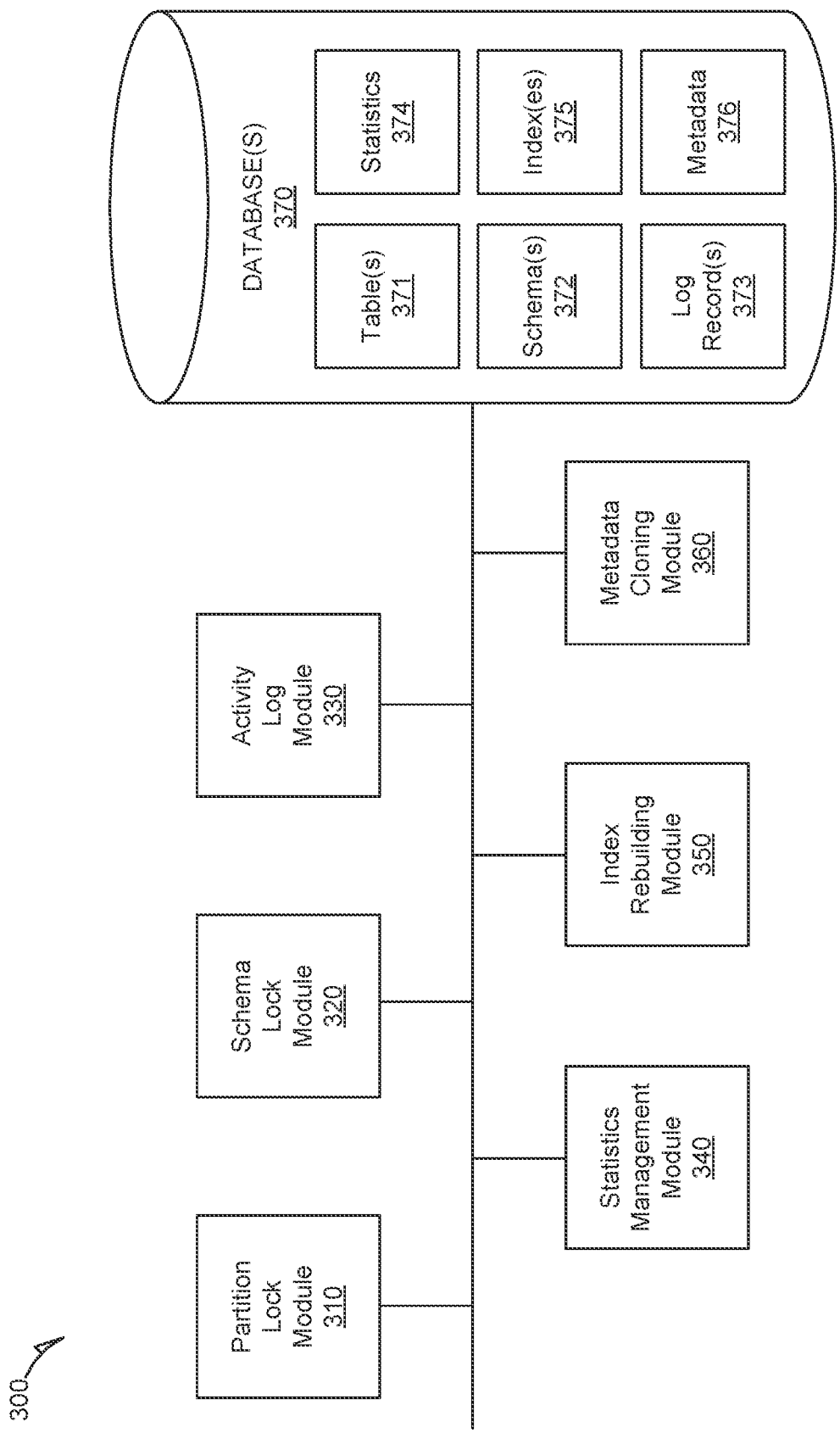
FIG. 3 is a block diagram illustrating an operation concurrency system, in accordance with some embodiments.

FIG. 3 is a block diagram illustrating an operation concurrency system 300, in accordance with an example embodiment. In some embodiments, the operation concurrency system 300 can comprise any combination of one or more of a partition lock module 310, a schema lock module 320, an activity log module 330, a statistics management module 340, an index rebuilding module 350, and a metadata cloning module 360. These modules 310, 320, 330, 340, 350, and 360 can reside on a machine having a memory and at least one processor (not shown). In some embodiments, these modules 310, 320, 330, 340, 350, and 360 can be incorporated into the enterprise application platform 112 in FIG. 1 (e.g., on application server(s) 126). However, it is contemplated that other configurations are also within the scope of the present disclosure. These modules 310, 320, 330, 340, 350, and 360 can be configured to perform operations with respect to data stored on one or more databases 370. Database(s) 370 can store any combination of one or more of one or more tables 371 of data, one or more schemas 372 of the tables 371, one or more log records 373, one or more sets of statistics 374, one or more indexes 375, and metadata 376. In some embodiments, database(s) 370 can be incorporated into database(s) 130 in FIG. 1. However, it is contemplated that other configurations are also within the scope of the present disclosure.

The partition lock module 310 can be configured to apply a partition level lock to a particular partition of a table 371 of data. In some embodiments, one partition level lock is available to be applied (e.g., taken or acquired) for each partition in the table 371. Each partition level lock can be configured to, when applied to a particular partition during the performance of an operation on that particular partition, block any other operations from being performed on that particular partition, while still allowing operations to be performed on other partitions of the table 371. The operations performed on the partitions can include, but are not limited to, split operations, merge operations, move operations, truncate operations, and drop operations. The operations can also include DML operations, including, but not limited to, insert operations, select operations, update operations, and delete operations. Other operations are also within the scope of the present disclosure.

Figure 4:
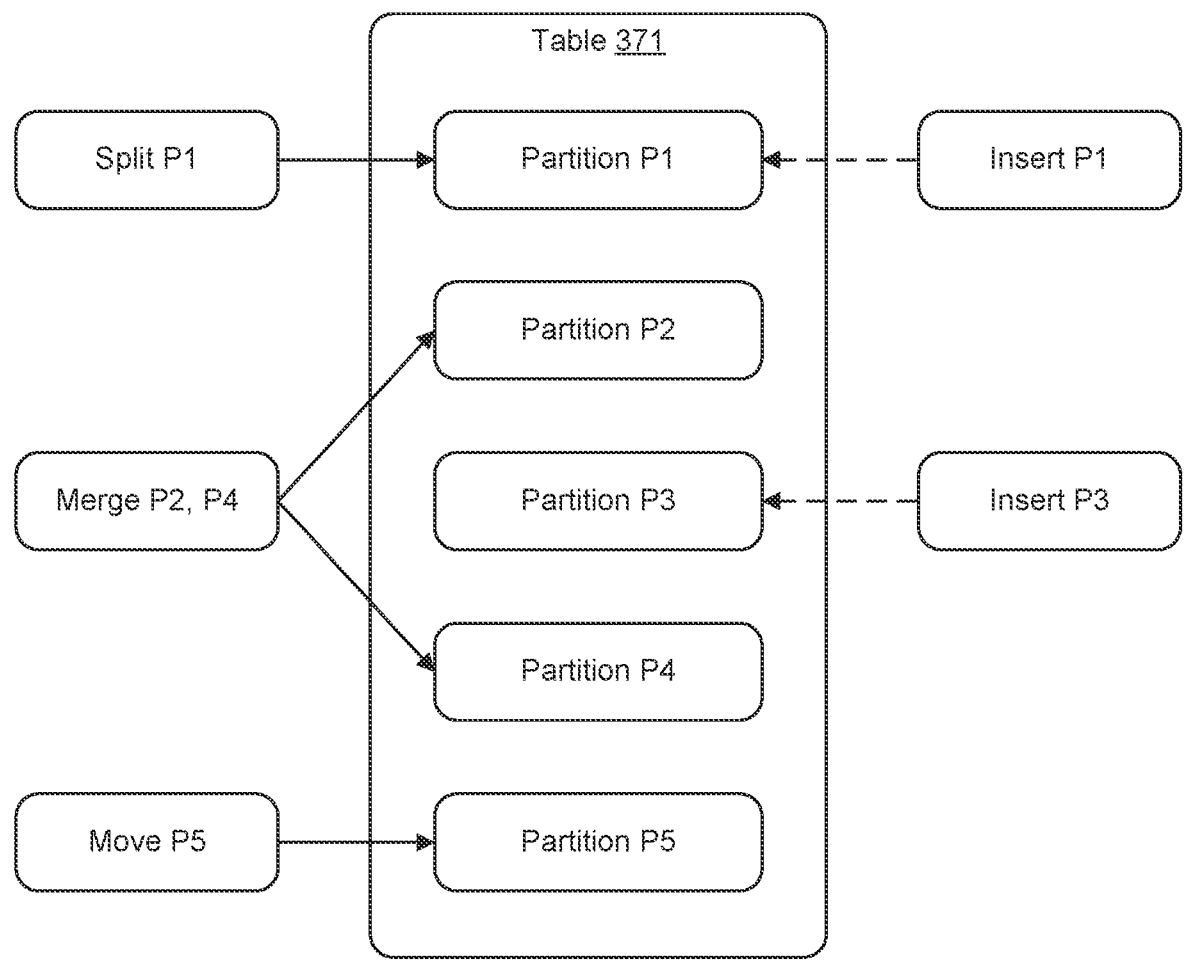
FIG. 4 is a block diagram illustrating a table of data, in accordance with some embodiments.

FIG. 4 is a block diagram illustrating a table 371 of data, in accordance with some embodiments. For example, table 371 can be divided into 5 partitions: P1, P2, P3, P4, and P5. In one example, a merge operation can be performed to merge partition P2 with partition P4. A corresponding partition level lock can be applied to each of partition P2 and partition P4 while the merge operation is being performed. As a result of the partition level locks on partitions P2 and P4, the performance of a split operation, or some other operation, on P2 or P4 can be blocked, while other operations on other partitions (e.g., a split operation on P1 and a move operation on P5) can be allowed. Partition level locks can be released in response to the completion of the corresponding operations on the corresponding partitions. Accordingly, in the example of this paragraph, the partition level locks on P2 and P4 can be released in response to the completion of the merge operation.

Referring back to FIG. 3, the partition lock module 310 can also be configured to implement partition level lock promotion. Partition level lock promotion can comprise exchanging multiple lower-level locks for a partition level lock once a predetermined threshold number of lower-level locks has been met (e.g., once the predetermined threshold number of lower-level locks has been applied). These lower-level locks can comprise locks on data structures of a lower level than a partition, such as row level locks.

The schema lock module 320 can be configured to apply a schema level lock on the schema 372 of the table 371 in order to synchronize table level schema modification performed by multiple concurrent partition level operations. The schema level lock can also help in blocking concurrent DML operations during the table schema modification phase of the online partition level operation.

In one example, there can be a first operation of partitions P1 and P2 being merged into P1. There can also be a second operation that is performed concurrently with the first operation to split partition P3 into P3' and P3". The first operation can take a partition lock on each of P1 and P2, while the second operation can take a partition lock on P3. Since P3' and P3" are newly created and not yet known to users and/or processes that utilize the enterprise application platform 112, no locks are needed on P3' and P3". When the first operation is complete, the first operation will want to update the schema 372 of the table 371. The schema 372 of the table 371 includes information about the structure of the table 371, including, but not limit to, the number of partitions, names of partitions, identifiers of partitions, etc. The schema 372 can be in a catalog (e.g., syspartitions catalog). When the second operation is complete, the second operation will also want to update the schema 372 of the table 371. Thus, both operations will want to perform a common activity.

With traditional systems, when both the first operation and the second operation want to update the schema 372 of the table 371, there can be a deadlock due to each operation taking an exclusive table intent lock.

The schema lock module 320 can implement a schema lock in order to solve the deadlock problem. The schema level lock can be at the table level. When the operations would like to perform the update at the schema level, they can take a schema level lock. Since the sequence of locks that are acquired remains constant across these operations, the deadlock can be avoided. The operation concurrency system 300 can first take table intent locks, then separate partition level locks, and then the schema level lock in that sequence. In the example above, when the update of the schema 372 based on the first operation is being performed, a schema level lock can be applied to the schema 372 of the table 371. The update of the schema 372 based on the second operation can be delayed until the schema level lock from the update for the first operation is released, thus avoiding a deadlock.

The activity log module 330 can enable a simulation of concurrent DML operations on a partition that is undergoing a maintenance activity by using a log of activities (e.g., operations) being requested to be performed. In one example, during a split of a partition, there can be a time when access to the partitions being operated on is available. For example, when splitting P1 into P1' and P1" (e.g., in FIG. 4), a partition level lock can be applied to P1. However, access to P1 can be allowed while P1 is being split. Hence, concurrent DML access can be allowed to the partitions being operated on, not only to the other partitions. There can be pockets of time when an exclusive lock is taken, and there can be pockets of time when access is allowed. At the time when access is allowed to these partitions, activity log records 373 of the operations that are happening concurrently can be maintained. There can be operations that are happening to these partitions concurrently. For example, 5 rows can be inserted into P1 (e.g., as shown in FIG. 4 with the "Insert P1" element), while P1 is being split. Activity log records 373 of the operations that are happening concurrently can be maintained. For example, 5 insert log records 373 for these 5 rows that are being inserted can be maintained (e.g., stored). While the split operation is about to finish, there can be a synchronization (sync) phase, where the 5 log records 373 can be applied (e.g., the operation(s) of the log records 373 can be performed or executed).

In some embodiments, the activity log module 330 can avoid applying log records of attempted operations on partitions that have only a single operation being attempted on them. For example, in FIG. 4, an insert operation can also be performed on P3. Since P3 is not otherwise having an operation being performed on it, the activity log module 330 can filter this insert operation on P3 while re-applying the log record 373 on P1.

The statistics management module 340 can be configured to enable table level statistics maintenance through collection of partition level statistics by the online partition level operations. Each concurrent partition level operation can generate local partition level statistics that can be available for use. The global table level statistics can be generated by merging the local partition level statistics Statistics 374 about data in the table 371 can be maintained. There can be multiple tables 371. The statistics management module 340 can create statistics 374 for every table 371. The statistics 374 (e.g., the number of rows in the table, the number of unique values in a particular column of the table, etc.) can be later used by an optimizer for optimizing queries. The performance of operations (e.g., deleting a partition, truncating a partition, etc.) can change the statistics for partitions, and thus, change the statistics 374 for the table 371. The statistics management module 340 can maintain statistics at a partition level for each partition, and then combine all of the partition level statistics to create table level statistics 374.

When a partition level utility is being run, at that point in time, the entire global level statistics are not generated for every operation. For example, if P1 is being split and P5 is being split concurrently, only local level statistics can be gathered. The operation that is splitting P1 would gather local statistics. The operation that is splitting P5 would gather local statistics. Later, the statistics management module 340 can merge the P1 statistics with the global level statistics and merge the P5 statistics with the global level statistics.

The index rebuilding module 350 can be configured to delay the rebuilding of a global index for the table 371 until no other operations are being performed on the table 371. In this respect, every partition level operation does not rebuild the global index, but rather delegates the responsibility for rebuilding the global index to the last committed partition level operation.

The tables 371 can support two types of indexes 375, global indexes and partition local indexes. The partition local index can examine the partition data, while the global index can examine the entire table data. For example, P1 and P2 can merge into one partition P1. At the end of the merge operation, the global index can examine the data in some way to select the Row identifier (ID) file that belonged in the partition P2 and know that now it belongs to P1. The indexes can still reflect that it belongs in partition P2, but the data knows that it is now in partition P1. So, the global indexes can be corrected at the end partition level operations as well.

In traditional systems, since the P1 split and the P2 split were not allowed to happen concurrently, each of these operations would try to build the global index at the end of their respective operation. For example, after P1 is split, the operation would rebuild the global index. Similarly, after P2 is split, the operation would rebuild the global index. However, such traditional systems unnecessarily spend time and resources in re-building the global index repeatedly.

The index rebuilding module 350 can employ a mechanism to delay the rebuilding of a global index for the table 371 until no other operations are being performed on the table 371. For example, if the server (e.g., application server 126 of FIG. 1) recognizes that P1 and P2 are being split at the same point in time and they are executing concurrently, the operation that finishes first can do a check to see if there are any other operations that are still working on any other partition in the table 371. If there are any other operations that are still working on any other partition in the table 371, then the operation can delegate its responsibility for rebuilding the global index to the operation that is still alive. The last operation that is being committed can determine that there is no other task that is alive and know that it is its prerogative to rebuild the global index.

The metadata cloning module 360 can be configured to clone metadata 376 (e.g., the number of partitions) of a table 371 based on the performance of operations on partitions of the table 371, and then generate new metadata 376 for the table 371 based on a merging of the cloned metadata 376.

Metadata 376 for a table 371 can be part of in-memory structures. When partition level operations are performed, some of the values of the in-memory structures can be changed. In one example of a table 371 with 5 partitions (P1, P2, P3, P4, and P5), a split operation can be performed on P1 to split it into P1' and P1", while a merge operation can be performed on P3 and P4. The split operation can result in the number of partitions increasing from 5 to 6, while the merge operation can result in the number of partitions decreasing from 5 to 4. The metadata cloning module 360 can be configured to generate clones of the original metadata 376 for each of the operations. For example, a first clone of the metadata 376 can be generated based on the split operation, reflecting the increase in the number of partitions from 5 to 6. A second clone of the metadata 376 can also be generated based on the merge operation, reflecting the decrease in the number of partitions from 5 to 4. The clones can then be merged, thereby generating new metadata 376 for the table 371. In the example provided in this paragraph, the new metadata 376 would reflect the number of partitions being 5, as the split operation and the merge operation canceled each other out with respect to their effect on the number of partitions.

In some embodiments, a partition level lock is applied even though an identification of the appropriate partition is unknown. For example, a global index can know that Row 1 exists on Page 100, but not know to which partition Row 1 belongs. Accordingly, when the global index is used for an operation (e.g., scanning a table 371), the appropriate partition information can be unknown. In some embodiments, the partition lock module 310 is configured to apply a covering partition lock on all of the partitions of the table 371 in response to a determination that the identity of the appropriate partition is unknown.

Figure 5:
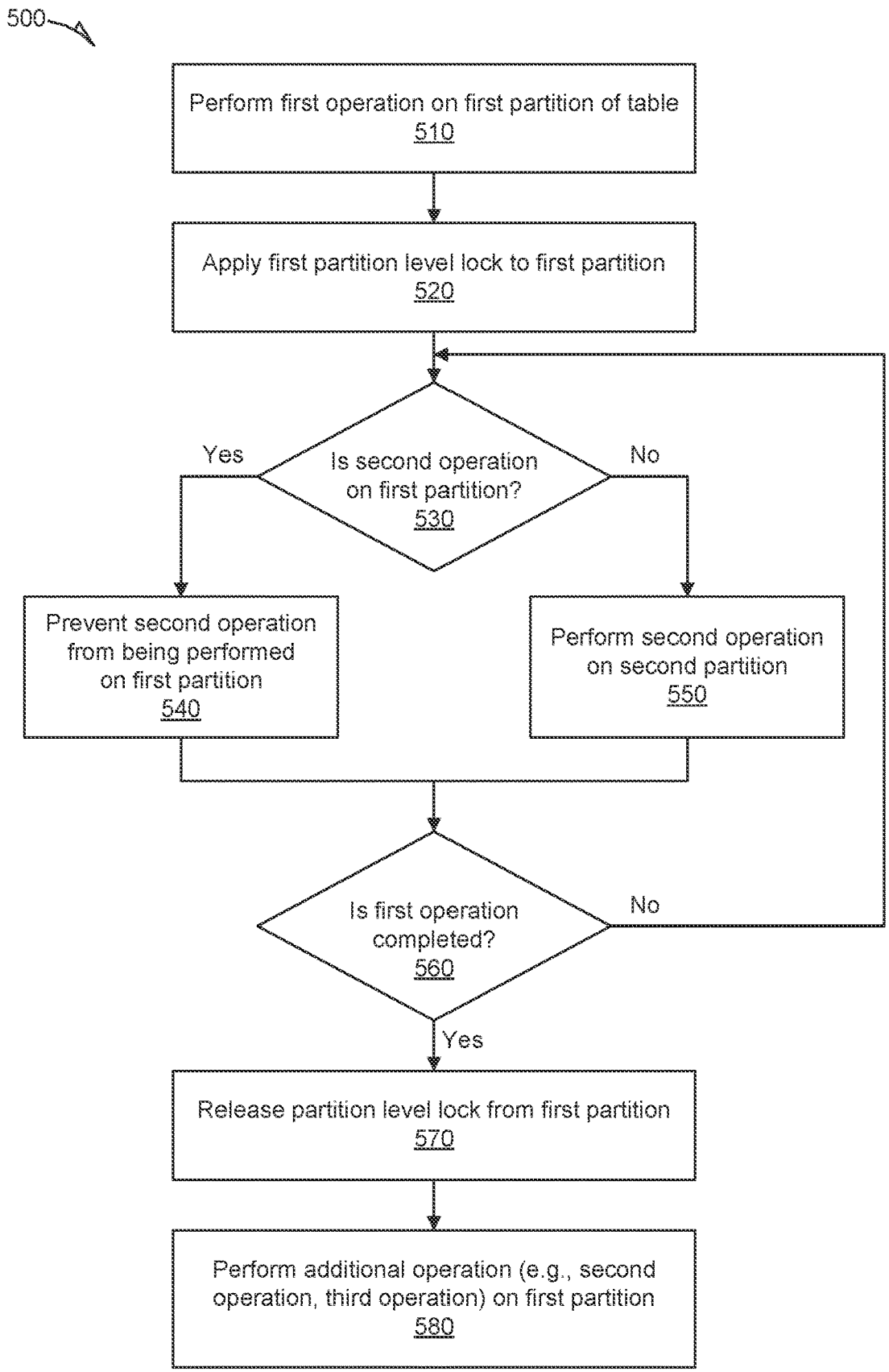
FIG. 5 is a flowchart illustrating a method, in accordance with some embodiments.

FIG. 5 is a flowchart illustrating a method 500, in accordance with some embodiments. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by the operation concurrency system 300 of FIG. 3, or any combination of one or more of its modules (e.g., partition lock module 310), as described above.

At operation 510, a first operation can be performed on a first partition of a table of data. The first partition can be one of a plurality of partitions of the table, with each partition in the plurality of partitions having a plurality of rows.

At operation 520, a first partition level lock can be applied to the first partition for a period in which the first operation is being performed on the first partition. The first partition level lock can prevent any operation other than the first operation from being performed on the first partition during the period the first partition level lock is being applied to the first partition.

At operation 530 a second operation can be attempted to be performed on a partition of the table, and it can be determined whether the second operation is being attempted to be performed on the first partition. If it is determined that the second operation is being attempted to be performed on the first partition, then, at operation 540, the first partition level lock can block, or otherwise prevent, the second operation from being performed on the first partition. In some embodiments, the second operation can be placed in a queue until the partition level lock on the first partition is released, at which time the second operation can be performed. If it is determined, at operation 530, that the second operation is not being attempted to be performed on the first partition, but rather on a second partition, then, at operation 550, the second operation can be performed on the second partition.

At operation 560, it can be determined whether the first operation has completed. If it is determined that the first operation as completed, then, at operation 570, the first partition level lock can be released from the first partition. At operation 580, an additional operation on the first partition can then be performed. In some embodiments, this additional operation can be the second operation that was prevented from being performed at operation 540. In some embodiments, this additional operation can be another operation that has not been yet been attempted to be performed. (e.g., a third operation). If it is determined, at operation 560, that the first operation has not completed, then the method returns to operation 530, where the second operation (or another operation) can once again be attempted to be performed and a determination can be made as to whether the second operation is being attempted to be performed on the first partition.

It is contemplated that any of the other features described within the present disclosure can be incorporated into method 500.

The methods of FIGS. 6-12, discussed below, can be incorporated into the method 500 of FIG. 5. Similarly, the features of FIG. 5 can be incorporated into the methods of FIGS. 6-12. For example, any of the methods of FIGS. 6-12 can be inserted at the beginning, at the end, or in the middle of the method 500 of FIG. 5. Accordingly, reference can be made below in the description of FIGS. 6-12 to terms, concepts, and features of FIG. 5.

Figure 6:
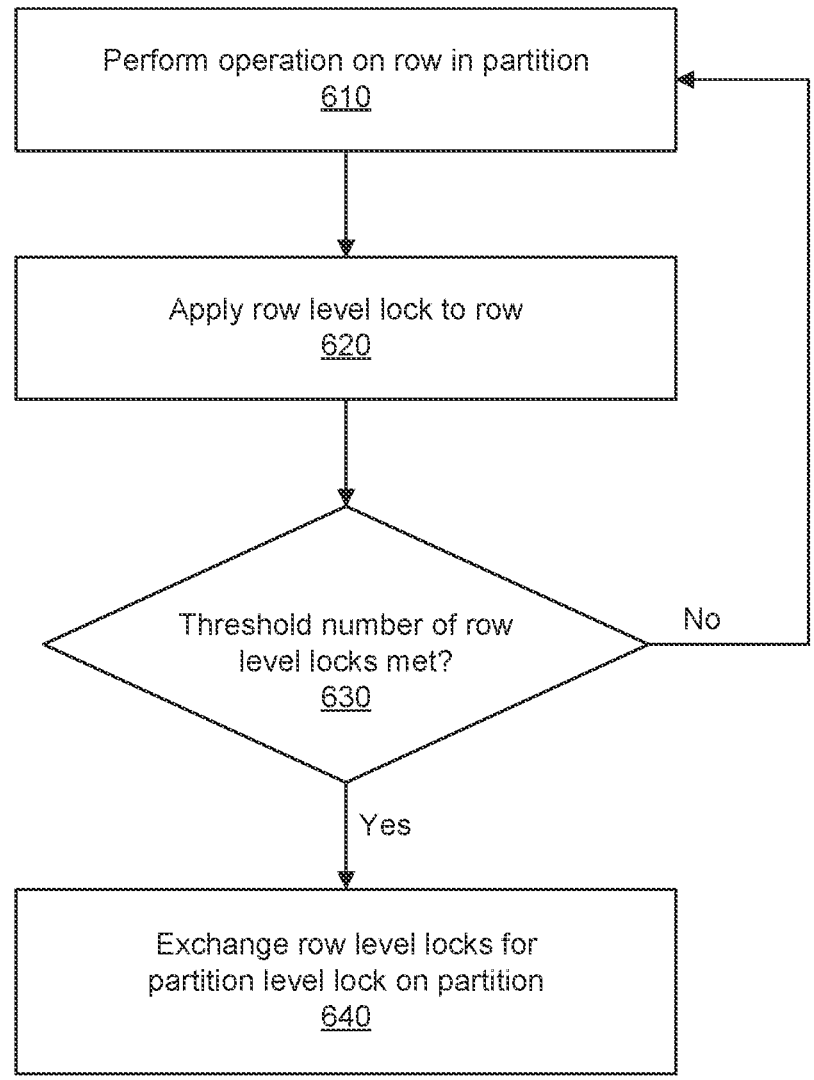
FIG. 6 is a flowchart illustrating a method, in accordance with some embodiments.

FIG. 6 is a flowchart illustrating a method, in accordance with some embodiments. Method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the operation concurrency system 300 of FIG. 3, or any combination of one or more of its modules (e.g., partition lock module 310), as described above.

At operation 610, an operation can be performed on a row in a partition (e.g., the first partition of FIG. 5) of a table having a plurality of partitions. At operation 620, a row level lock can be applied to the row. At operation 630, it can be determined whether or not a predetermined threshold number of row level locks have been met for the partition (e.g., has the predetermined threshold number of row level locks been applied to rows of the partition). If it has been determined that the predetermined threshold number has been met, then, at operation 640, the row level locks can be exchanged for a partition level lock on the partition. If it has been determined that the predetermined threshold number has not been met, then the method 600 can return to operation 610, where another operation on another row in the partition can be performed.

It is contemplated that any of the other features described within the present disclosure can be incorporated into method 600.

Figure 7:
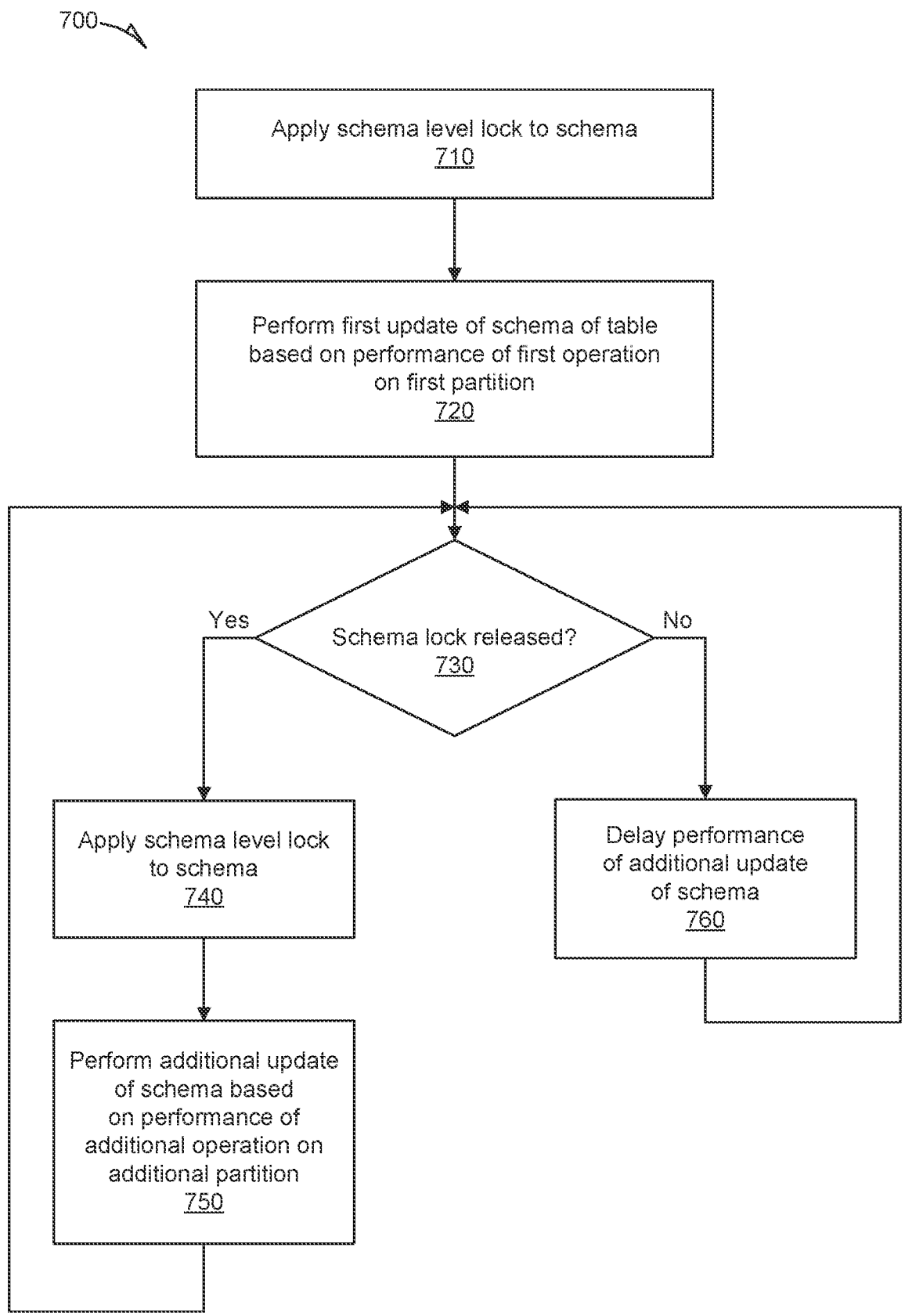
FIG. 7 is a flowchart illustrating a method, in accordance with some embodiments.

FIG. 7 is a flowchart illustrating a method, in accordance with some embodiments. Method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the operation concurrency system 300 of FIG. 3, or any combination of one or more of its modules (e.g., schema lock module 320), as described above.

At operation 710, a schema level lock can be applied to a schema of a table. At operation 720, a first update of the schema of the table can be performed based on the performance of the first operation on the first partition. The schema level lock can be applied to the schema of the table for a period covering the performance of the first update of the schema. The schema level lock can prevent any update other than the first update from being performed on the schema during the performance of the first update on the schema.

At operation 730, an additional operation (e.g., a second operation) on an additional partition (e.g., a second partition) of the table can prompt an attempt to update the schema, and it can be determined whether the schema level lock has been released.

If it is determined, at operation 730, that the schema level lock has been released, then, at operation 740, a schema level lock can be applied to the schema of the table, and, at operation 750, an additional update (e.g., a second update) of the schema based on the performance of the additional operation on the additional partition can be performed. The schema level lock can be applied to the schema of the table for a period covering the performance of the additional update of the schema. The method 700 can return to operation 730, where another additional operation can prompt another update of the schema, and another determination can be made as to whether the schema level lock has been released.

If it is determined, at operation 730, that the schema level lock has not yet been released, then, at operation 760, the performance of the additional update of the schema can be delayed until after a completion of the earlier update (e.g., the first update).

It is contemplated that any of the other features described within the present disclosure can be incorporated into method 700.

Figure 8:
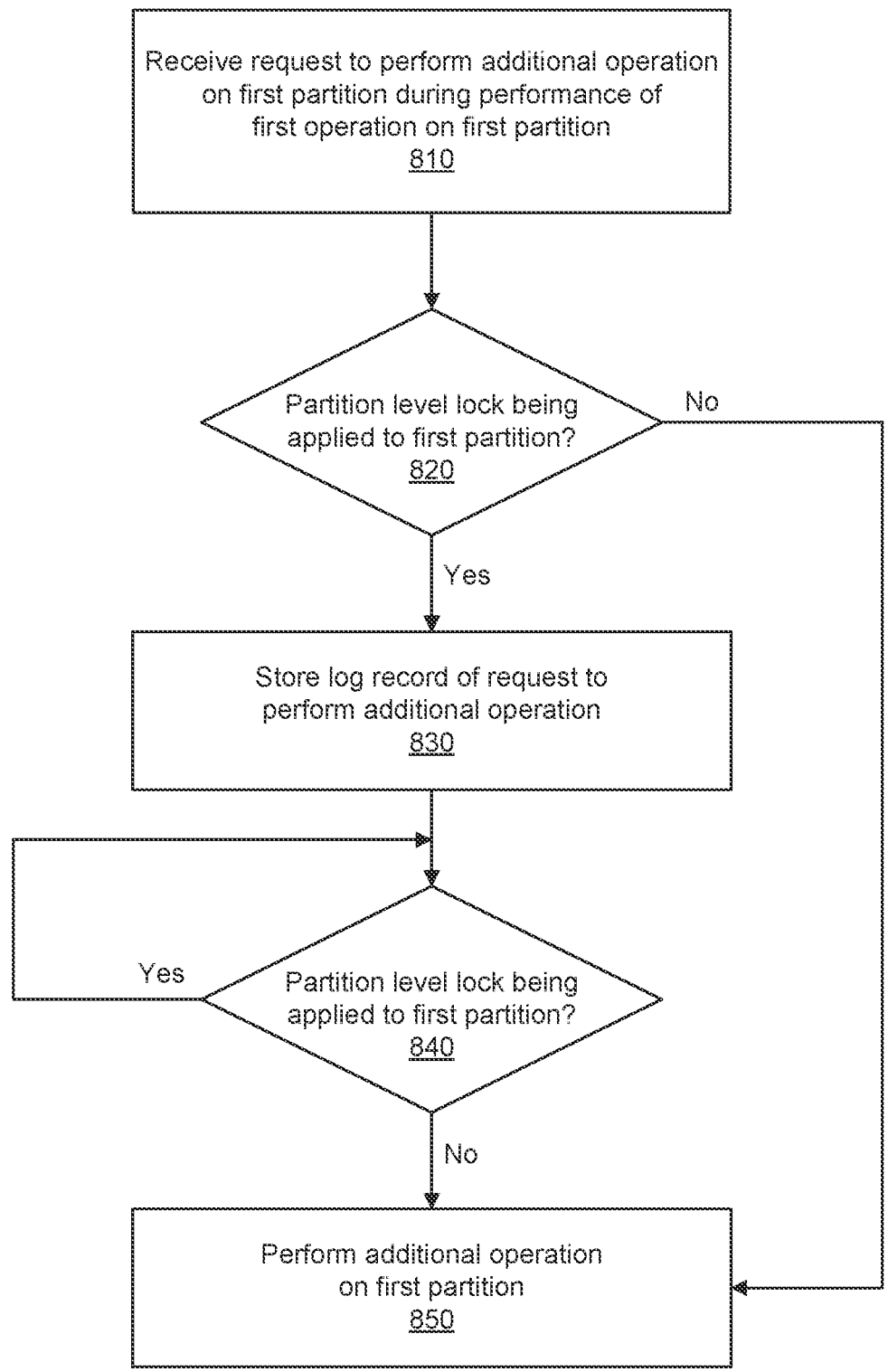
FIG. 8 is a flowchart illustrating a method, in accordance with some embodiments.

FIG. 8 is a flowchart illustrating a method, in accordance with some embodiments. Method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the operation concurrency system 300 of FIG. 3, or any combination of one or more of its modules (e.g., activity log module 330), as described above.

At operation 810, a request to perform an additional operation on the first partition can be received during the performance of the first operation on the first partition.

At operation 820, it can be determined whether the first partition level lock is being applied to the first partition at the time the request to perform the additional operation is received. If it is determined that the first partition level lock is not being applied, then, at operation, 850, the additional operation can be performed on the first partition. If it is determined that the first partition level lock is being applied, then, at operation 830, a log record of the request can be stored.

At operation 840, it can be determined whether the first partition level lock is still being applied to the first partition. If it is determined that the first partition level lock is still being applied, then the additional operation can be retried at a later time. In some embodiments, the method 800 can repeat the determination operation at operation 840 until it is determined that the first partition level lock is not being applied. In some embodiments, a delay can be implemented before a repeat of operation 840. If it is determined, at operation 840, that the first partition level lock is not being applied, then, at operation 850, the additional operation can be performed on the first partition.

It is contemplated that any of the other features described within the present disclosure can be incorporated into method 800.

Figure 9:
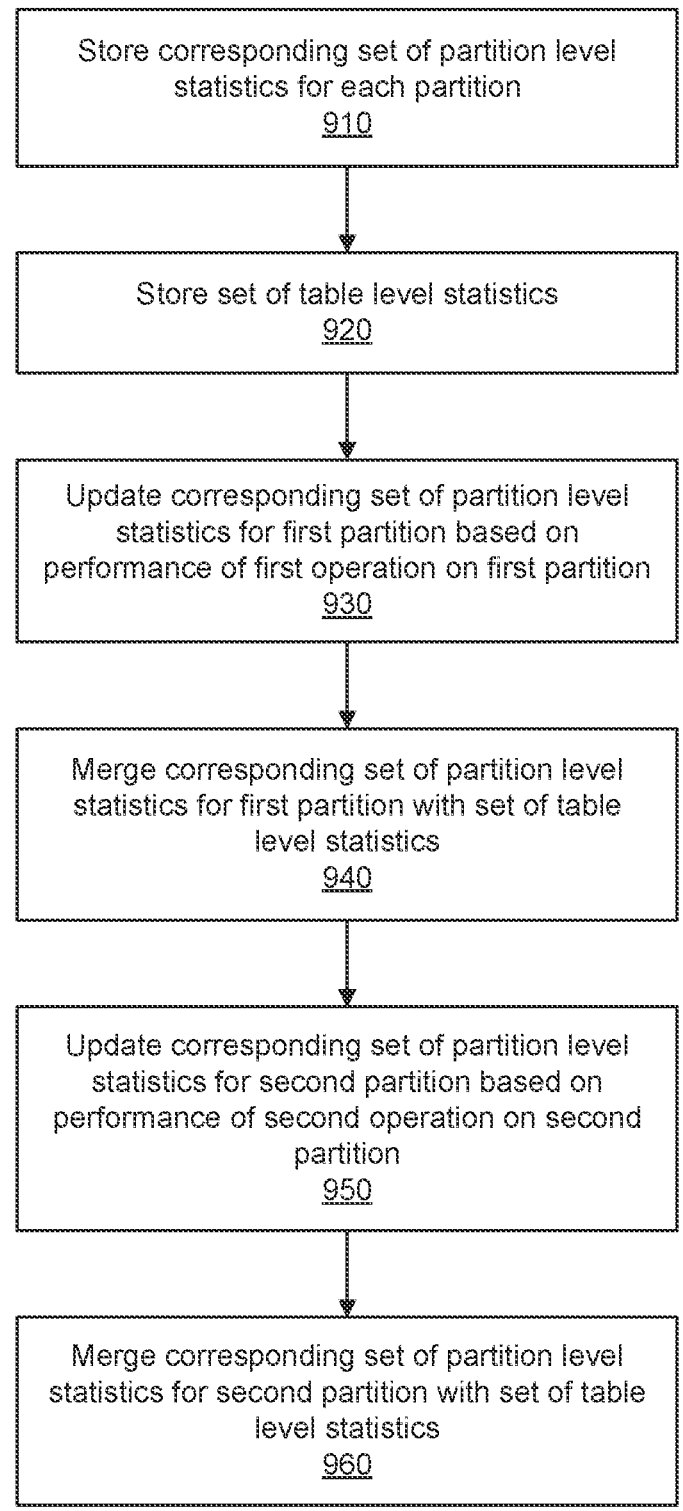
FIG. 9 is a flowchart illustrating a method, in accordance with some embodiments.

FIG. 9 is a flowchart illustrating a method, in accordance with some embodiments. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the operation concurrency system 300 of FIG. 3, or any combination of one or more of its modules (e.g., statistics management module 340), as described above.

At operation 910, a corresponding set of partition level statistics can be stored for each one of the partitions in the plurality of partitions. Each set of partition level statistics can comprise statistics specific to the partition to which the set corresponds. At operation 920, a set of table level statistics can be stored for the table. At operation 930, the corresponding set of partition level statistics for the first partition can be updated based on the performance of the first operation on the first partition. At operation 940, the corresponding set of partition level statistics for the first partition can be merged with the set of table level statistics. At operation 950, the corresponding set of partition level statistics for the second partition can be updated based on the performance of the second operation on the second partition. At operation 960, the corresponding set of partition level statistics for the second partition can be merged with the set of table level statistics.

It is contemplated that any of the other features described within the present disclosure can be incorporated into method 900.

Figure 10:
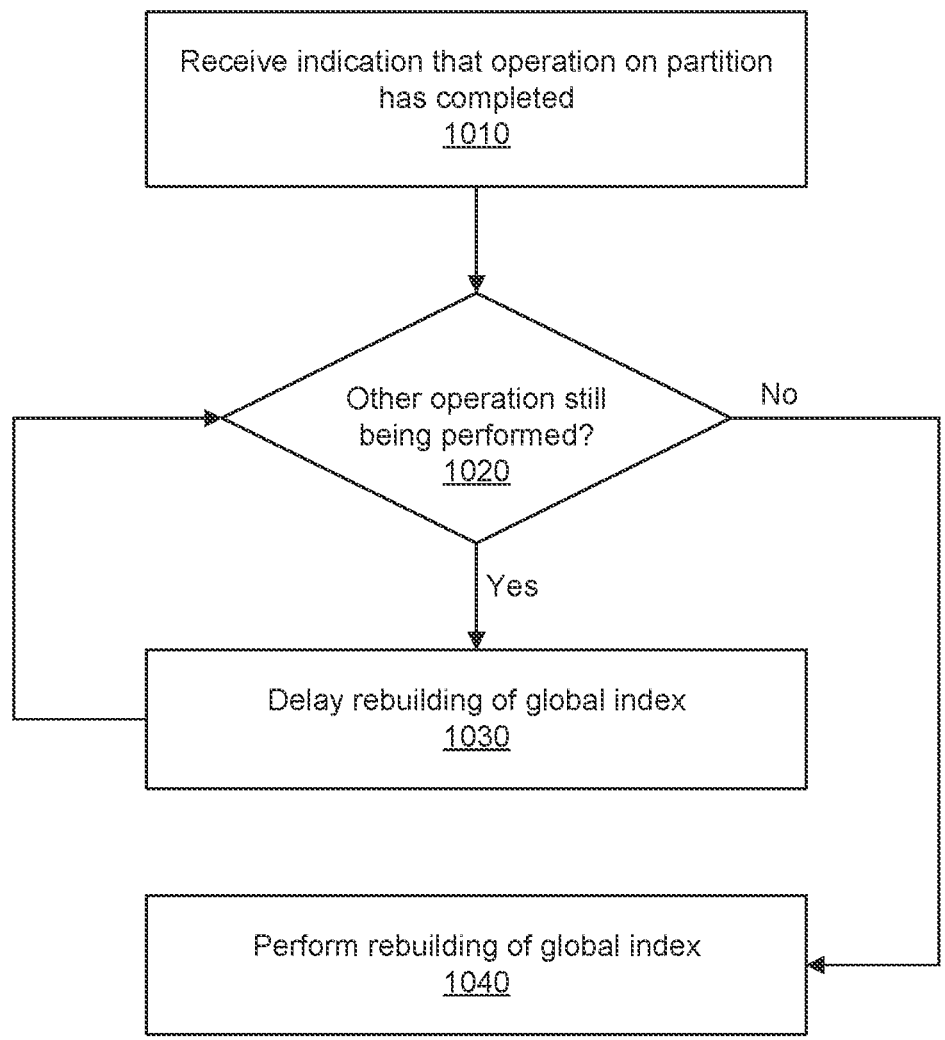
FIG. 10 is a flowchart illustrating a method, in accordance with some embodiments.

FIG. 10 is a flowchart illustrating a method, in accordance with some embodiments. Method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the operation concurrency system 300 of FIG. 3, or any combination of one or more of its modules (e.g., index rebuilding module 350), as described above.

At operation 1010, an indication that an operation on a partition of a table has completed can be received. At operation 1020, in response to the indication of the operation completing, it can be determined whether any other operations are still being performed on any partitions of the table. If it is determined that no other operations are being performed on any partitions of the table, then, at operation 1040, a rebuilding of the global index of the table is performed. The rebuilding of the global index can reflect the effects of the performance any operations on any of the partitions of the table. If it is determined that another operation is still being performed, then, at operation 1030, the rebuilding of the global index can be delayed, and the method can return to operation 1020.

It is contemplated that any of the other features described within the present disclosure can be incorporated into method 1000.

Figure 11:
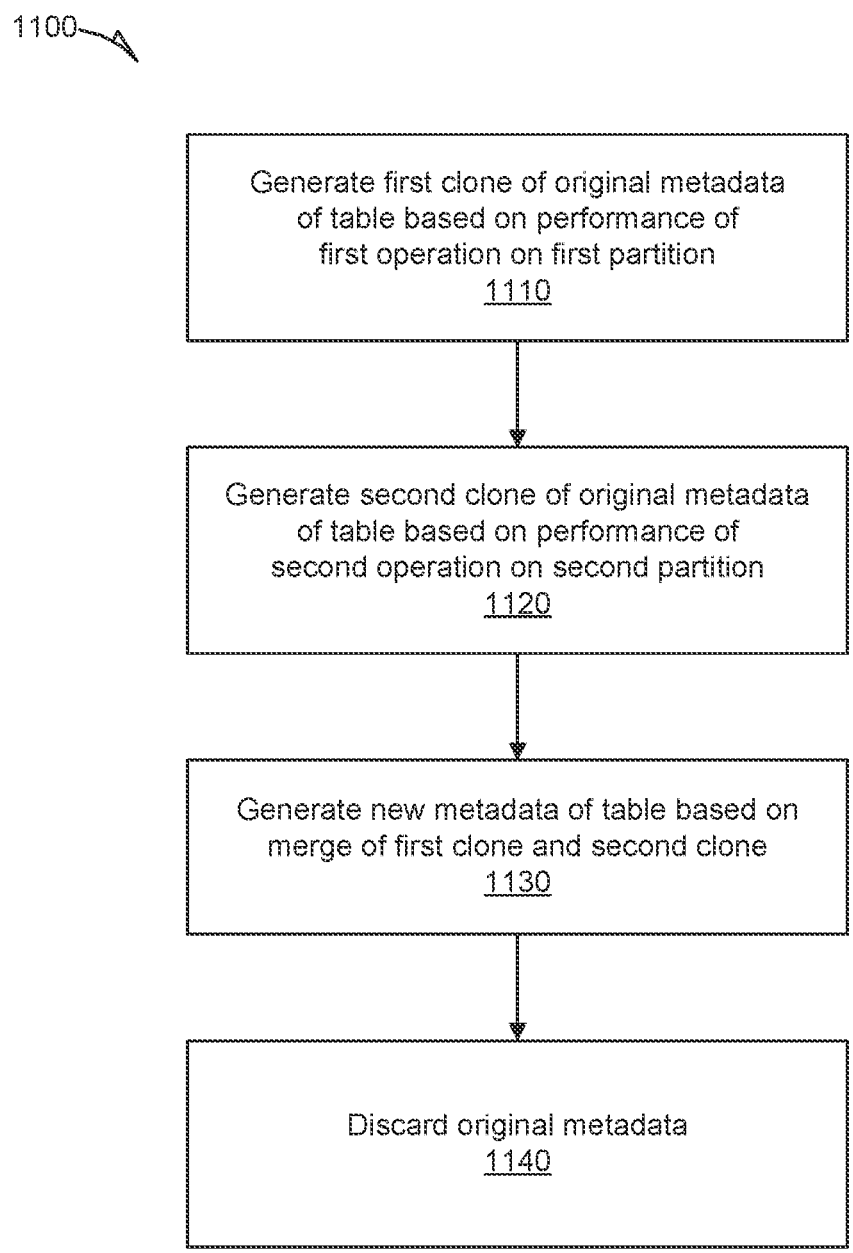
FIG. 11 is a flowchart illustrating a method, in accordance with some embodiments.

FIG. 11 is a flowchart illustrating a method, in accordance with some embodiments. Method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the operation concurrency system 300 of FIG. 3, or any combination of one or more of its modules (e.g., metadata cloning module 360), as described above.

At operation 1110, a first clone of original metadata of the table can be generated based on the performance of the first operation on the first partition. At operation 1120, a second clone of the original metadata of the table can be generated based on the performance of the second operation on the second partition. At operation 1130, new metadata of the table can be generated based on a merge of the first clone and the second clone. At operation 1140, the original metadata can be discarded It is contemplated that any of the other features described within the present disclosure can be incorporated into method 1100.

Figure 12:
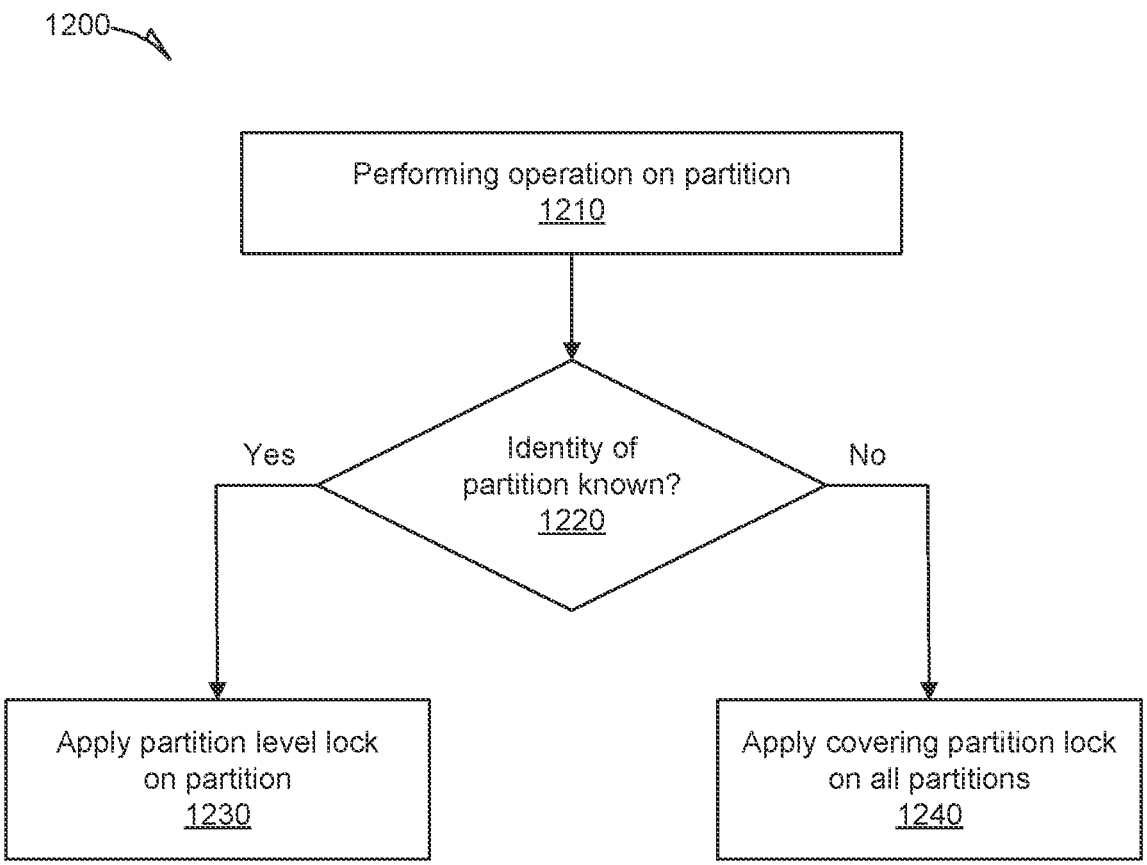
FIG. 12 is a flowchart illustrating a method, in accordance with some embodiments.

FIG. 12 is a flowchart illustrating a method, in accordance with some embodiments. Method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the operation concurrency system 300 of FIG. 3, or any combination of one or more of its modules (e.g., partition lock module 310), as described above.

At operation 1210, an operation is performed on a partition of the table. The partition can be one of the plurality of partitions of the table. At operation 1220, it can be determined whether an identity of the partition is known. If it is determined that the identity of the partition is known, then, at operation 1230, a partition level lock can be applied to the partition. If it is determined that the identity of the partition is not known, then, at operation 1240, a covering partition lock can be applied on all partitions of the table for a period in which the operation is being performed on the partition. The covering partition lock can prevent any operation other than the operation currently being performed from being performed on any of the partitions of the table during the period the covering partition lock is being applied.

It is contemplated that any of the other features described within the present disclosure can be incorporated into method 1200.

Example Mobile Device

Figure 13:
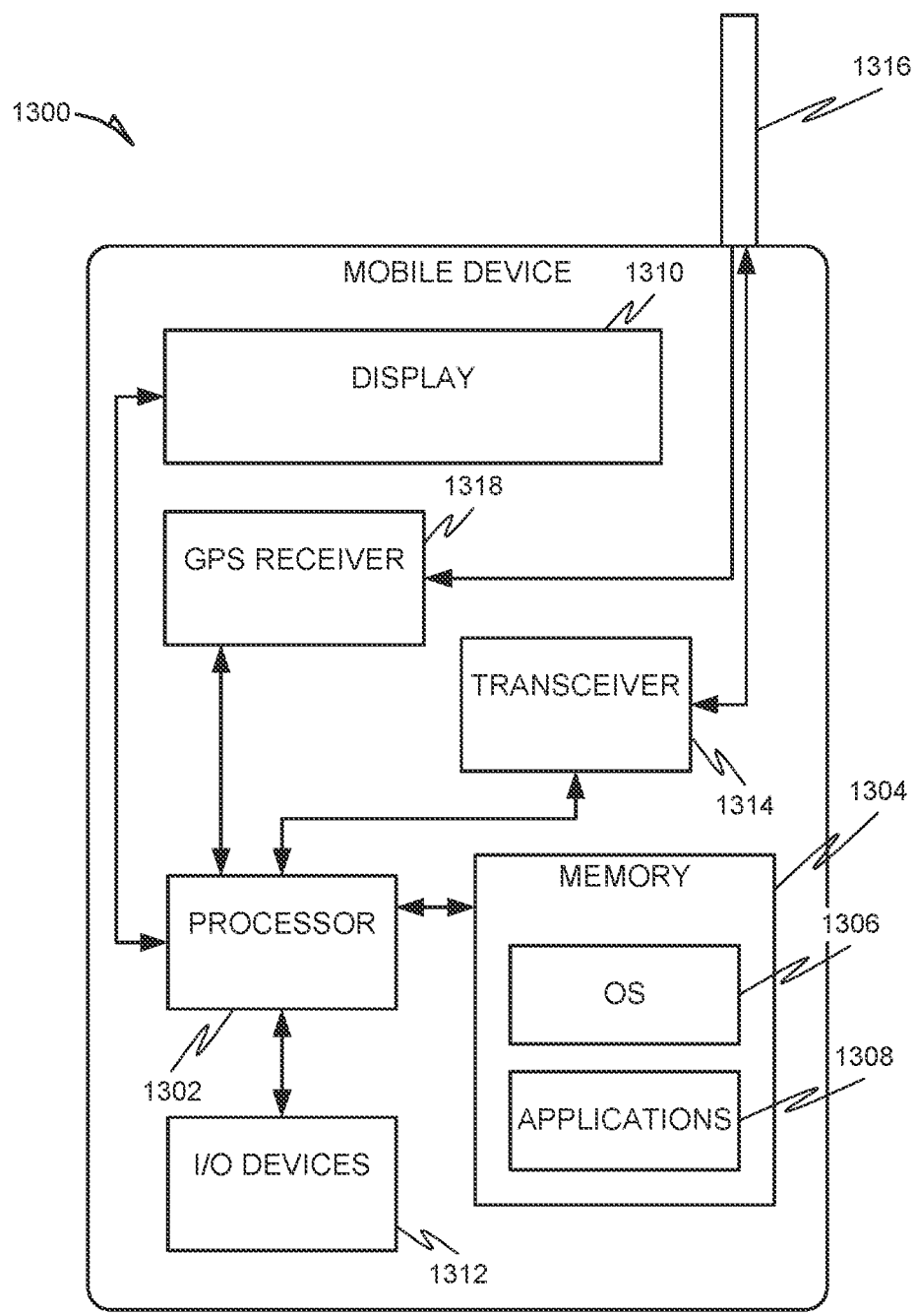
FIG. 13 is a block diagram illustrating a mobile device, in accordance with some embodiments.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location enabled application that can provide LBSs to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 14:
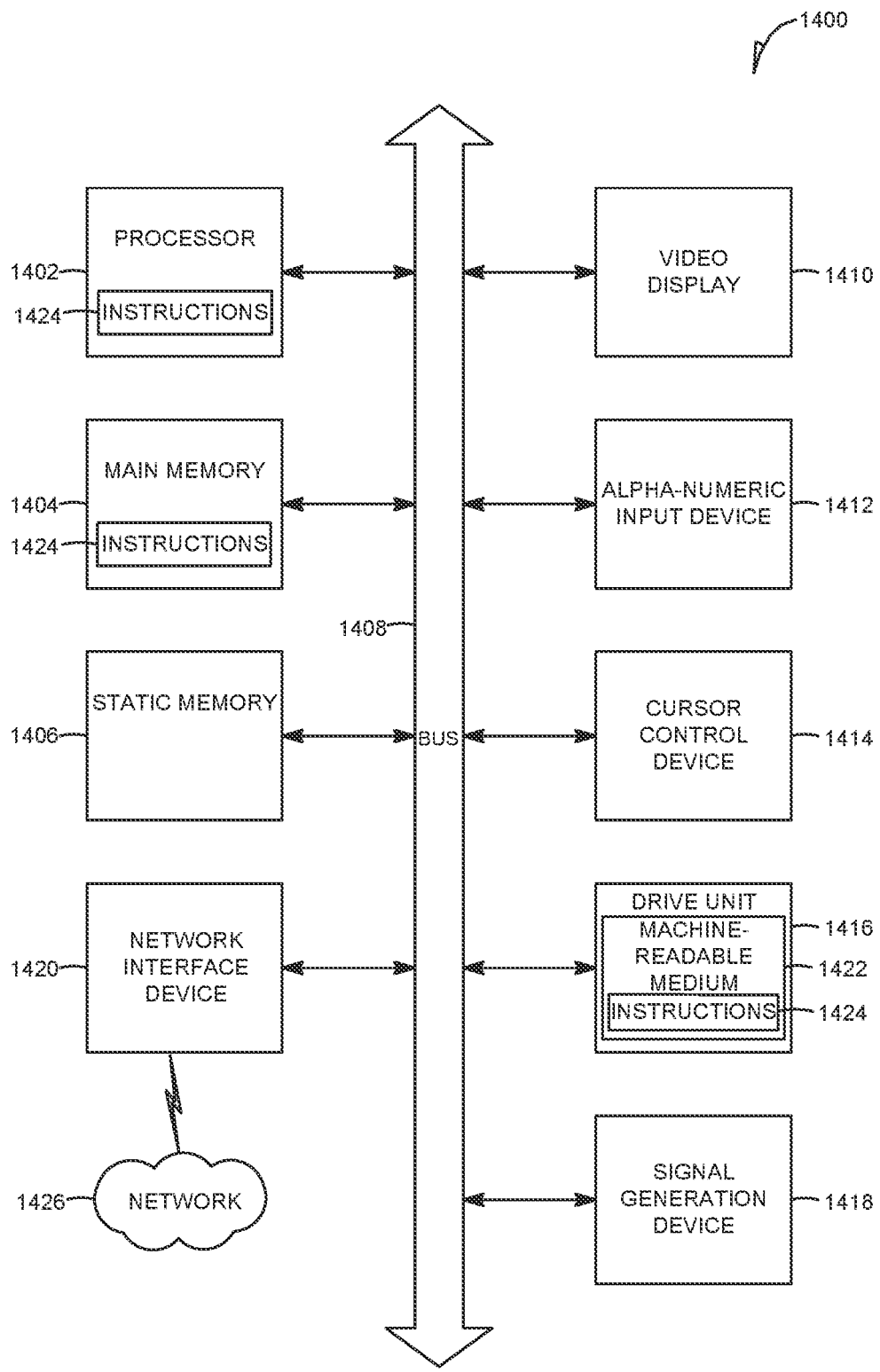
FIG. 14 is a block diagram of an example computer system on which methodologies described herein can be executed, in accordance with some embodiments.

FIG. 14 is a block diagram of a machine in the example form of a computer system 1400 within which instructions 1424 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 can further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of data structures and instructions 1424 (e.g., software) embodying or utilized by any one or more of the methodologies or functions described herein. The instructions 1424 can also reside, completely or at least partially, within the main memory 1404 and/or within the processor 1402 during execution thereof by the computer system 1400, the main memory 1404 and the processor 1402 also constituting machine-readable media. The instructions 1424 can also reside, completely or at least partially, within the static memory 1406.

While the machine-readable medium 1422 is shown in an example embodiment to be a single medium, the term "machine-readable medium" can include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1424 can further be transmitted or received over a communications network 1426 using a transmission medium. The instructions 1424 can be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   at least one processor; and
   a non-transitory computer-readable medium storing executable instructions that, when executed, cause the at least one processor to perform system operations comprising:
      performing a first operation on a row of a plurality of rows in a first partition of a table of data, the first partition being one of a plurality of partitions of the table, each partition in the plurality of partitions having a plurality of rows;
      applying a row level lock to the row of the plurality of rows in the first partition of the table of data;
      based on the applying the row level lock to the row in the first partition, determining that a predefined threshold number of row level locks corresponding to concurrent operations have been applied within the first partition, the concurrent operations including the first operation;
      based on the determining that the predefined threshold number of row level locks have been applied within the first partition, applying a first partition level lock to the first partition for a period in which the first operation is being performed on the first partition, the first partition level lock preventing any additional operations other than the concurrent operations for which the row level locks have been applied within the first partition from being performed on the first partition during the period the first partition level lock is being applied to the first partition; and
      performing a second operation on a second partition of the table at a point in time during which the first operation is being performed on the first partition, the second partition being one of the plurality of partitions of the table.

2. The system of claim 1, wherein the first operation and the second operation each comprise a data manipulation language (DML) operation.

3. The system of claim 1, wherein the first operation and the second operation each comprise one of an insert operation, a select operation, an update operation, a delete operation, a split operation, a merge operation, a move operation, a truncate operation, or a drop operation.

4. The system of claim 1, wherein the first operation and the second operation are performed within an enterprise application platform.

5. The system of claim 1, wherein the system operations further comprise:
performing a first update of a schema of the table based on the performance of the first operation on the first partition;
applying a schema level lock to the schema of the table for a period covering the performance of the first update of the schema, the schema level lock preventing any update other than the first update from being performed on the schema during the performance of the first update on the schema; and
delaying a performance of a second update of the schema until after a completion of the first update based on the applying of the schema level lock to the schema, the second update being based on the performance of the second operation on the second partition.

6. The system of claim 1, wherein the system operations further comprise:
storing a corresponding set of partition level statistics for each one of the partitions in the plurality of partitions, each set of partition level statistics comprising statistics specific to the partition to which the set corresponds;
storing a set of table level statistics for the table;
updating the corresponding set of partition level statistics for the first partition based on the performance of the first operation on the first partition;
merging the corresponding set of partition level statistics for the first partition with the set of table level statistics;
updating the corresponding set of partition level statistics for the second partition based on the performance of the second operation on the second partition; and
merging the corresponding set of partition level statistics for the second partition with the set of table level statistics.

7. The system of claim 1, wherein the system operations further comprise:
generating a first clone of original metadata of the table based on the performance of the first operation on the first partition;
generating a second clone of the original metadata of the table based on the performance of the second operation on the second partition;
generating new metadata of the table based on a merge of the first clone and the second clone; and
discarding the original metadata.

8. A computer-implemented method performed by a computer system having a memory and at least one hardware processor, the computer-implemented method comprising:
performing a first operation on a row of a plurality of rows in a first partition of a table of data, the first partition being one of a plurality of partitions of the table, each partition in the plurality of partitions having a plurality of rows;
applying a row level lock to the row of the plurality of rows in the first partition of the table of data;
based on the applying the row level lock to the row in the first partition, determining that a predefined threshold number of row level locks corresponding to concurrent operations have been applied within the first partition, the concurrent operations including the first operation;
based on the determining that the predefined threshold number of row level locks have been applied within the first partition, applying a first partition level lock to the first partition for a period in which the first operation is being performed on the first partition, the first partition level lock preventing any additional operations other than the concurrent operations for which the row level locks have been applied within the first partition from being performed on the first partition during the period the first partition level lock is being applied to the first partition; and
performing a second operation on a second partition of the table at a point in time during which the first operation is being performed on the first partition, the second partition being one of the plurality of partitions of the table.

9. The computer-implemented method of claim 8, wherein the first operation and the second operation each comprise a data manipulation language (DML) operation.

10. The computer-implemented method of claim 8, wherein the first operation and the second operation each comprise one of an insert operation, a select operation, an update operation, a delete operation, a split operation, a merge operation, a move operation, a truncate operation, or a drop operation.

11. The computer-implemented method of claim 8, wherein the first operation and the second operation are performed within an enterprise application platform.

12. The computer-implemented method of claim 8, further comprising:
performing a first update of a schema of the table based on the performance of the first operation on the first partition;
applying a schema level lock to the schema of the table for a period covering the performance of the first update of the schema, the schema level lock preventing any update other than the first update from being performed on the schema during the performance of the first update on the schema; and
delaying a performance of a second update of the schema until after a completion of the first update based on the applying of the schema level lock to the schema, the second update being based on the performance of the second operation on the second partition.

13. The computer-implemented method of claim 8, further comprising:
storing a corresponding set of partition level statistics for each one of the partitions in the plurality of partitions, each set of partition level statistics comprising statistics specific to the partition to which the set corresponds;
storing a set of table level statistics for the table;
updating the corresponding set of partition level statistics for the first partition based on the performance of the first operation on the first partition;
merging the corresponding set of partition level statistics for the first partition with the set of table level statistics;
updating the corresponding set of partition level statistics for the second partition based on the performance of the second operation on the second partition; and merging the corresponding set of partition level statistics for the second partition with the set of table level statistics.

14. The computer-implemented method of claim 8, further comprising:
generating a first clone of original metadata of the table based on the performance of the first operation on the first partition;
generating a second clone of the original metadata of the table based on the performance of the second operation on the second partition;
generating new metadata of the table based on a merge of the first clone and the second clone; and
discarding the original metadata.

15. A non-transitory machine-readable storage medium, tangibly embodying a set of instructions that, when executed by at least one processor, causes the at least one processor to perform system operations comprising:
performing a first operation on a row of a plurality of rows in a first partition of a table of data, the first partition being one of a plurality of partitions of the table, each partition in the plurality of partitions having a plurality of rows;
applying a row level lock to the row of the plurality of rows in the first partition of the table of data;
based on the applying the row level lock to the row in the first partition, determining that a predefined threshold number of row level locks corresponding to concurrent operations have been applied within the first partition, the concurrent operations including the first operation;
based on the determining that the predefined threshold number of row level locks have been applied within the first partition, applying a first partition level lock to the first partition for a period in which the first operation is being performed on the first partition, the first partition level lock preventing any additional operations other than the concurrent operations for which the row level locks have been applied within the first partition from being performed on the first partition during the period the first partition level lock is being applied to the first partition; and
performing a second operation on a second partition of the table at a point in time during which the first operation is being performed on the first partition, the second partition being one of the plurality of partitions of the table.

16. The non-transitory machine-readable storage medium of claim 15, wherein the first operation and the second operation each comprise a data manipulation language (DML) operation.

17. The non-transitory machine-readable storage medium of claim 15, wherein the first operation and the second operation each comprise one of an insert operation, a select operation, an update operation, a delete operation, a split operation, a merge operation, a move operation, a truncate operation, or a drop operation.

18. The non-transitory machine-readable storage medium of claim 15, wherein the first operation and the second operation are performed within an enterprise application platform.

19. The non-transitory machine-readable storage medium of claim 15, wherein the system operations further comprise:
performing a first update of a schema of the table based on the performance of the first operation on the first partition;
applying a schema level lock to the schema of the table for a period covering the performance of the first update of the schema, the schema level lock preventing any update other than the first update from being performed on the schema during the performance of the first update on the schema; and
delaying a performance of a second update of the schema until after a completion of the first update based on the applying of the schema level lock to the schema, the second update being based on the performance of the second operation on the second partition.

20. The non-transitory machine-readable storage medium of claim 15, wherein the system operations further comprise:
storing a corresponding set of partition level statistics for each one of the partitions in the plurality of partitions, each set of partition level statistics comprising statistics specific to the partition to which the set corresponds;
storing a set of table level statistics for the table;
updating the corresponding set of partition level statistics for the first partition based on the performance of the first operation on the first partition;
merging the corresponding set of partition level statistics for the first partition with the set of table level statistics;
updating the corresponding set of partition level statistics for the second partition based on the performance of the second operation on the second partition; and
merging the corresponding set of partition level statistics for the second partition with the set of table level statistics.

* * * * *